United States Patent

Carney et al.

[15] 3,667,700

[45] June 6, 1972

[54] TAPE TRANSPORT APPARATUS

[72] Inventors: Murray C. Carney; Ellis Speicher, III, both of Springfield, Ill.

[73] Assignee: Sangamo Electric Company, Springfield, Ill.

[22] Filed: Mar. 9, 1970

[21] Appl. No.: 17,847

[52] U.S. Cl. ..........242/189, 242/75.5

[51] Int. Cl. ..........B65h 59/38, B65h 63/02, G11b 15/32

[58] Field of Search......242/186, 188, 189, 190, 75.3–75.44, 242/75.5, 75.51

[56] References Cited

UNITED STATES PATENTS 3,517,895 6/1970 Kraft..........242/190

3,507,459 4/1970 Campbell, Jr..........242/190

*Primary Examiner*—Leonard D. Christian

*Attorney*—Brown, Jackson, Boettcher and Dienner

[57] ABSTRACT

Apparatus for transferring a flexible tape from a supply reel to a take-up reel including drive motor and brake means for each of the tape reels, a capstan disposed between the reels for effecting selective transfer of the tape between the reels, and a pair of tape storage devices each disposed between one of the tape reels and the capstan, each storage device being adapted to accommodate variations in tape length between the associated tape reel and the capstan and having switch contacts operable to control rotation and braking of the associated tape reel in a manner to maintain linear tape transfer over the capstan.

16 Claims, 11 Drawing Figures

INVENTORS
MURRAY C. CARNEY
ELLIS SPEICHER III
BY Johnson, Duenner, Emrich, Verbeck & Wagner
ATTYS.

TABLE A
SUPPLY

| | | | | | | | | | | | | | MOTOR | BRAKE |
|---|---|---|---|---|---|---|---|---|---|---|---|---|---|---|
| | | RWD | SW-1 | SW-2 | G 1 | G 2 | G 3 | G 4 | G 5 | G 6 | G 7 | G 8 | G 18 | G 19 |
| R̄ | ZONE 3 | 0 | 0 | 0 | 1 | 1 | 1 | 1 | 0 | 1 | 0 | 1 | 1 | 0 |
| | ZONE 2 | 0 | 1 | 0 | 1 | 1 | 1 | 0 | 1 | 0 | 1 | 0 | 0 | 1 |
| | ZONE 1 | 0 | 1 | 1 | 1 | 0 | 1 | 0 | 1 | 1 | 0 | 1 | 0 | 0 |
| R | ZONE 3 | 1 | 0 | 0 | 0 | 1 | 1 | 1 | 0 | 1 | 0 | 1 | 1 | 0 |
| | ZONE 2 | 1 | 1 | 0 | 0 | 1 | 1 | 1 | 0 | 1 | 0 | 1 | 1 | 0 |
| | ZONE 1 | 1 | 1 | 1 | 0 | 0 | 0 | 1 | 1 | 1 | 1 | 0 | 0 | 1 |
| | | 0 | 0 | 1 | IMPOSSIBLE STATE | | | | | | | | | |
| | | 1 | 0 | 1 | IMPOSSIBLE STATE | | | | | | | | | |

TABLE B
TAKE-UP

| | | | | | | | | | | | | | MOTOR | | BRAKE |
|---|---|---|---|---|---|---|---|---|---|---|---|---|---|---|---|
| | | RWD | SW-3 | SW-4 | G 9 | G 10 | G 11 | G 12 | G 13 | G 14 | G 15 | G 16 | G 20 | G 17 | G 21 |
| R̄ | ZONE 3 | 0 | 0 | 0 | 1 | 1 | 1 | 1 | 0 | 1 | 0 | 0 | 1 | 1 | 0 |
| | ZONE 2 | 0 | 1 | 0 | 1 | 0 | 1 | 1 | 1 | 0 | 1 | 1 | 0 | 0 | 1 |
| | ZONE 1 | 0 | 1 | 1 | 1 | 0 | 0 | 1 | 1 | 1 | 1 | 0 | 0 | 1 | 0 |
| R | ZONE 3 | 1 | 0 | 0 | 0 | 1 | 1 | 0 | 0 | 1 | 1 | 1 | 0 | 0 | 1 |
| | ZONE 2 | 1 | 1 | 0 | 0 | 0 | 1 | 1 | 1 | 1 | 1 | 0 | 0 | 1 | 0 |
| | ZONE 1 | 1 | 1 | 1 | 0 | 0 | 1 | 1 | 1 | 1 | 1 | 0 | 0 | 1 | 0 |
| | | 0 | 0 | 1 | IMPOSSIBLE STATE | | | | | | | | | | |
| | | 1 | 0 | 1 | IMPOSSIBLE STATE | | | | | | | | | | |

INVENTORS
MURRAY C. CARNEY
ELLIS SPEICHER III

BY
Johnson, Dienner, Emrich, Verbeck & Wagner
ATTYS.

INVENTORS
MURRAY C. CARNEY
ELLIS SPEICHER III
BY
Johnson, Dienner, Emrich, Verbeck & Wagner
ATTYS.

TAPE TRANSPORT APPARATUS

BACKGROUND OF THE INVENTION

The present invention relates generally to tape transport apparatus, and particularly to tape storage means adapted to control rotation and braking of tape supply and take-up reels in a manner to maintain substantially linear tape travel over a capstan.

Tape transport mechanisms are widely used in the field of magnetic tape and wire recording and the like to transfer a continuous length of flexible tape or wire over a write/read head between a supply reel and a take-up reel. With recent developments in the computer field, it has become increasingly important to provide digital tape handling units capable of transferring digital tape with precise starting, stopping and back-spacing of the tape. This is necessary in order to write, back-space and read short blocks of data on the tape as well as to move the tape continuously. These operating characteristics require more stringent equipment standards than required by conventional tape recorder-reproducer apparatus. Due to the need for precise control of starting, stopping and backspacing of the tape during operation, the known tape transport mechanisms have employed rather complex and expensive variable speed tape drive motors in an attempt to maintain substantially linear tape supply to the capstan and over the write/read head. The known tape transport mechanisms are expensive and, in combination with large expensive computers, serve to restrict the availability of computers to only relatively large concerns having substantial financial means, while greatly precluding the purchase and use of such devices by smaller concerns which do not enjoy the financial positions of their big brother concerns. There thus exists a need for a highly efficient, yet relatively inexpensive, tape transport apparatus which will provide precise control of starting, stopping and back-spacing of a tape as is required in digital tape handling systems. The present invention provides apparatus which serves to fulfill this need.

SUMMARY OF THE INVENTION

One of the primary objects of the present invention is to provide a generally self-contained tape transport apparatus employing novel means for selectively transferring a continuous length of tape between supply and take-up reels, which apparatus is highly efficient yet relatively inexpensive.

Another object of the present invention is to provide a tape transport apparatus which utilizes inexpensive one-speed, start-stop reel drive motors controlled for unidirectional rotation by novel tape storage devices to establish substantially linear tape travel over the capstan and the write/read head.

Another object of the present invention is to provide a tape transport apparatus as described including a novel tape storage device supported between each of the tape reels and the capstan, each of the tape storage devices having means adapted to accommodate variations in the length of tape between the associated tape reel and the capstan, and including switch means operative in response to the tape accumulating means to control the associated tape reel drive motor and maintain linear tape travel over the drive capstan and the write/read head.

Another object of the present invention is to provide a tape transport apparatus as described wherein each tape storage device includes a tension arm which is adapted to engage the tape and is movable in response to variations in tape tension to effect actuation of switch contacts for controlling a reel drive circuit and thereby the rotation and braking of the associated tape reel drive means.

In carrying out the above objects and advantages of the present invention, a tape transport apparatus is provided having tape supply and take-up reels supported on mounting hubs selectively independently unidirectionally rotatable through single-speed, start-stop drive motors having brake means associated therewith. A flexible continuous length tape is supported by the tape reels and selectively guided over a capstan and write/read head disposed between the tape reels. A tape storage device is supported between each of the tape reels and the capstan, each of the tape storage devices including sensor means comprising a tension arm having a roller thereon for engagement with the tape. The tension arms are movable between arcuate zones in response to the tape tension and serve to accommodate variations in tape length between the associated tape reels and the capstan. Each tension arm has a cam associated therewith adapted to selectively open normally closed switch contacts of an associated control switch in response to movement of the corresponding tension arm between arcuate zones. Each control switch is coupled through a reel drive control circuit to one of the tape reel drive motors and brake means to control rotation and braking of the corresponding tape reel in relation to the arcuate position of the associated tension arm, and maintain substantially linear tape travel over the capstan and write/read head. Actuating arms are operatively associated with the tension arms and are manually adjustable to move the tension arms to positions allowing rapid threading of a tape over guide rollers and through the tape storage devices. Logic circuit means are provided to selectively enable the control circuit of the reel drive means such that rewinding of the tape can be controlled in response to movement of the tension arms.

Further objects and advantages of the present invention, together with the organization and manner of operation thereof may best be understood by reference to the following description of a preferred embodiment of the invention when taken in conjunction with the accompanying drawings, wherein like reference numerals identify like elements throughout the several views.

DESCRIPTION OF A PREFERRED EMBODIMENT

Figure 1:
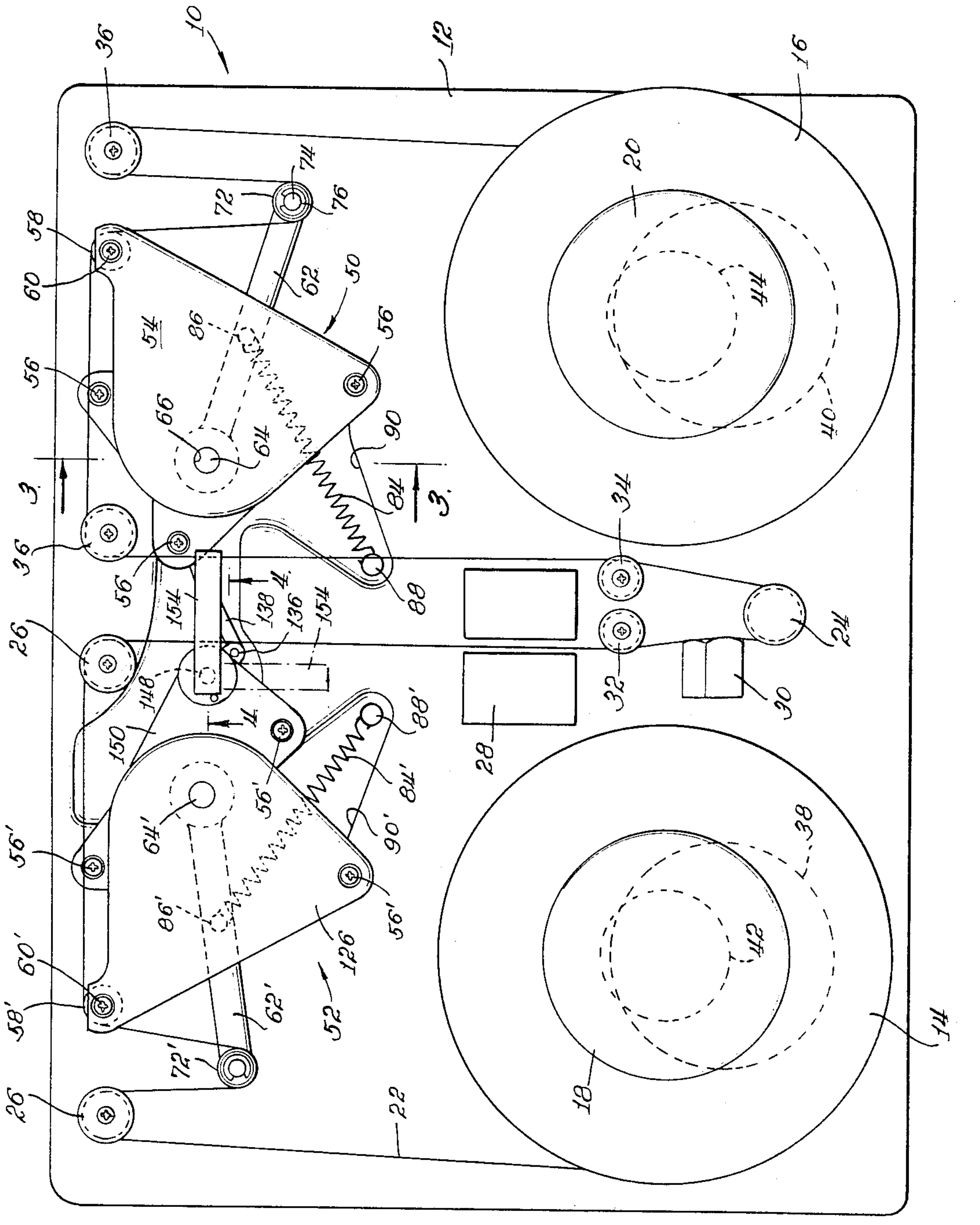
FIG. 1 is a front elevational view of a substantially self-contained tape transport apparatus having a continuous length tape supported for transfer between supply and take-up reels and tape storage devices in accordance with the present invention disposed between each of he reels and the capstan.

Referring now to the drawings, and in particular to FIG. 1, the present invention is illustrated as being embodied in a tape transport apparatus indicated generally at reference numeral 10. The tape transport apparatus 10 comprises a substantially self-contained unit adapted to be mounted in a case or rack mounted as in digital tape handling systems utilized in computer data stations and the like. The tape transport apparatus 10 has no manual mode controls other than a tape threading control, the mode control for the tape transport apparatus being in the form of electrical signal commands from logic circuitry or other external inputs which form no part of the present invention except insofar as explained below. It will be understood that while the present invention is described herein as finding particular application in digital tape handling mechanisms, it finds ready application in other mechanisms utilizing flexible tapes which must be transferred between supply and take-up reels in a precise controlled manner.

The tape transport apparatus 10 includes a mounting or support plate 12 which serves as the main chassis for supporting the components comprising the tape transport apparatus. The support plate 12 may be caused to lie in a horizontal or vertical plane depending upon the particular application of the tape transport apparatus. The mounting plate 12 supports a pair of tape supporting reels which, for purposes of description, will be said to comprise a supply reel 14 and a take-up reel 16. As will become apparent hereinbelow, the tape supporting reels 14 and 16 may be selectively controlled such that either of the reels serves alternately as a supply or take-up reel, depending upon the selected mode of operation. The tape reels 14 and 16 are releasably supported on rotatable reel mounting hubs 18 and 20, respectively, for conjoint rotation with the mounting hubs. The reel mounting hubs 18 and 20, per se, form no part of the present invention. A more detailed description of the reel mounting hubs 18 and 20 is set forth in the copending application, of Charles C. Patton, Ser. No. 755,913, filed Aug. 28, 1968, now U.S. Pat. No. 3,545,695 and assigned to the assignee of the present invention.

A continuous length flexible tape 22, such as a conventional magnetic coated tape adapted to have data bits or other indicia recorded thereon and read therefrom, is supported by the tape reels 16 and 18 for transfer therebetween, the tape being adapted to be wound on the reels in a known manner. A capstan drive wheel 24 is suitably supported by the mounting plate 12 intermediate the tape reels 14 and 16 and is adapted to engage the tape 22 and effect selective transfer thereof between the tape reels. To this end, the capstan drive wheel 24 is operatively associated with a capstan drive motor and brake assembly (not shown) adapted to receive signals or commands from a control circuit for effecting selected directional capstan rotation and braking. The particular capstan rotational drive control and brake assembly forms no part of the present invention and will not be described in greater detail herein.

The tape 22 is guided through a path between the supply and take-up reels 14 and 16, respectively, such that the tape is passed over the capstan drive wheel 24. To this end, the tape is passed from the supply reel 14 over a pair of tape guide rollers 26 which are suitably rotatably mounted on the mounting plate 12, and downwardly from the right hand guide roller 26 through a lamp photocell assembly 28 adapted to detect the presence of tape and the beginning and end portions of tape reflective markers selectively placed along the tape to indicate the position of the tape relative to the photocell. The tape is then passed over a guide roller 32, over a write and read head 30 adapted to write and read data bits or other indicia onto and from the tape in a known manner. From the head 30, the tape is passed around a capstan 24 rotatably supported on the mounting plate 12, upwardly over a guide roller 34 generally adjacent the guide roller 32, over a pair of laterally spaced guide rollers 36, and then down to the take-up reel 16, the upper guide rollers 36 also being suitably rotatably supported on the mounting plate 12. It will be understood that the tape reels 14 and 16, the capstan drive 24, and the associated guide rollers 26, 32, 34 and 36 are supported in generally coplanar relation.

The reel supporting hubs 18 and 20 are independently unidirectionally rotatably driven by associated single speed start-up devices comprising electric servo drive motors, indicated schematically at 38 and 40, respectively, and associated brake means, indicated schematically at 42 and 44, respectively, which are coupled to associated circuit means to be described more fully hereinbelow. The servo drive motors 38 and 40 each further having parking brake means (not shown) associated therewith to selectively lock the drive motors in non-rotating positions. The brake means 42 and 44 are of the anti-backlash type to prevent the tape reel drive servo system from hunting or chattering during starting and stopping of tape reel rotational movement. The servo drive motors 38 and 40 associated with the tape reels 14 and 16, respectively, are adapted for driving rotation only in a direction to take up tape on the reels. During transfer of the tape 22 between the tape reels 14 and 16, the servo drive motors and associated brake means for the reel supporting hubs 18 and 20 are selectively placed in motor-off, brake-off; motor-off, brake-on; or motor-on, brake-off conditions.

During the transfer of tape 22 between the tape reels 14 and 16 by means of the simplified unidirectional, single speed, start-stop servo drive arrangements for the tape reels, the length of tape between the tape reels may vary notwithstanding the constant rotational speed capstan drive wheel 24 which ideally would effect continuous linear tape travel past the write/read head 30. The present invention is directed primarily to tape storage means for cooperation with the continuous length tape 22 as it is transferred between the tape reels 14 and 16 to provide substantially linear tape travel over the capstan drive wheel 24 and thereby linear tape travel past the write/read head 30.

The tape storage means in accordance with the present invention is disposed between the supply and take-up reels 14 and 16, respectively, for cooperation with the tape 22 and, includes a pair of tape storage devices indicated generally at 50 and 52. The tape storage device 50 is disposed between the tape reel 16 and the capstan drive wheel 24, and is operatively associated with the servo drive motor 40 and brake means 44 for controlling rotation of reel 16. The tape storage device 52 is disposed between the tape reel 14 and the capstan drive wheel 24 and is operatively associated with the servo drive motor 38 and brake means 42 for controlling rotation of reel 14. The tape storage devices 50 and 52 are generally similar in construction.

Figure 2:
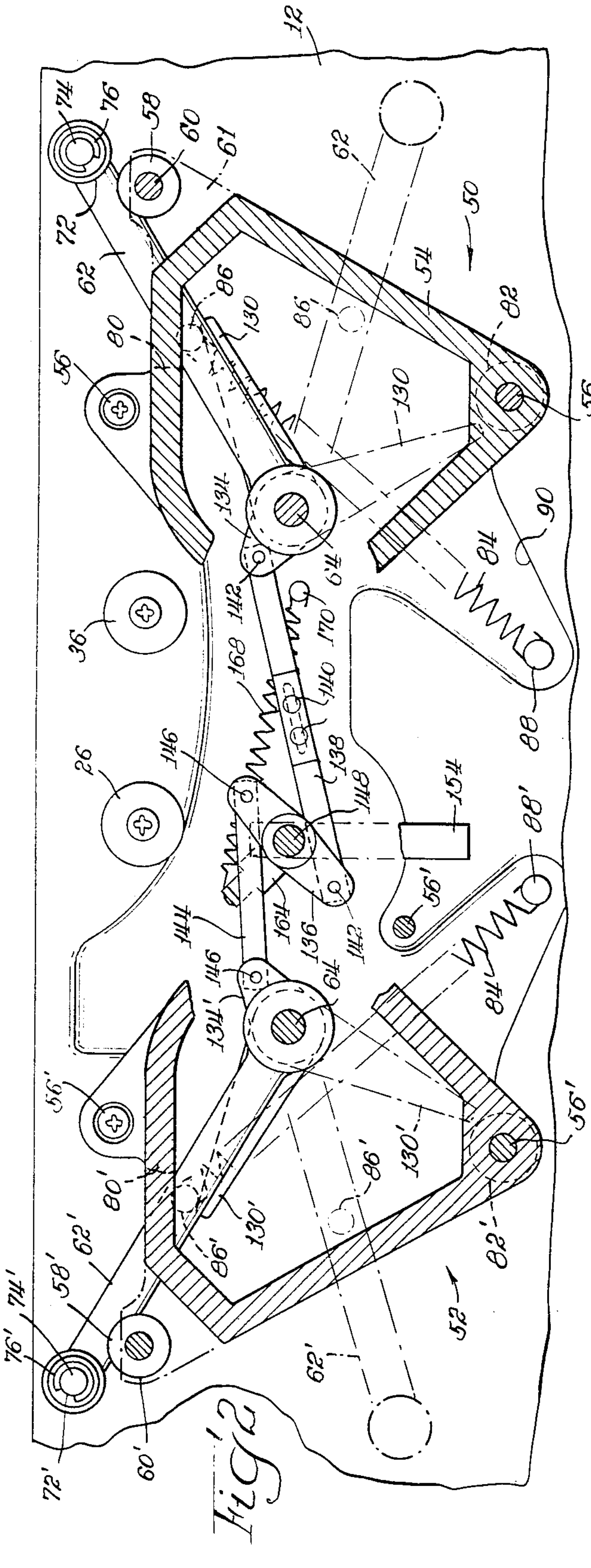
FIG. 2 is an enlarged partial front sectional view showing the tape tension arms, their biasing springs, and the tape threading arm adjustment arrangement.
Figure 3:
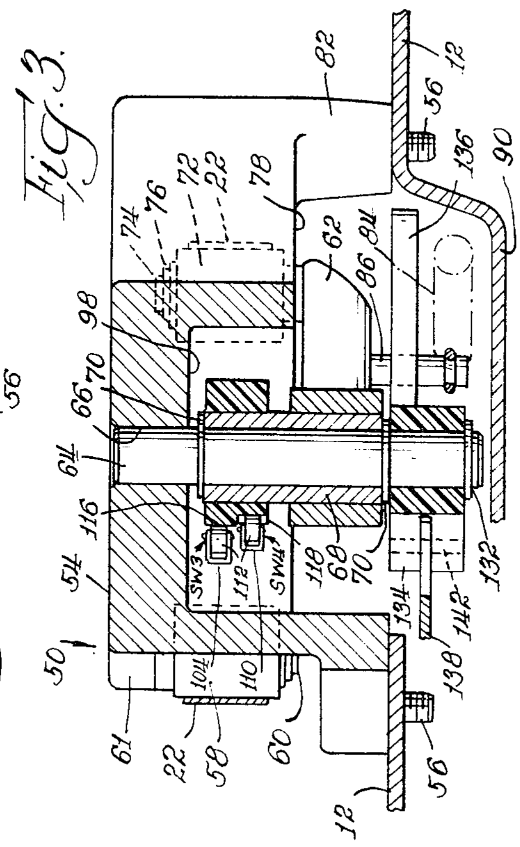
FIG. 3 is an enlarged partial sectional view taken generally along line 3—3 of FIG. 1, but shifted 90°.
Figures 5, 6:
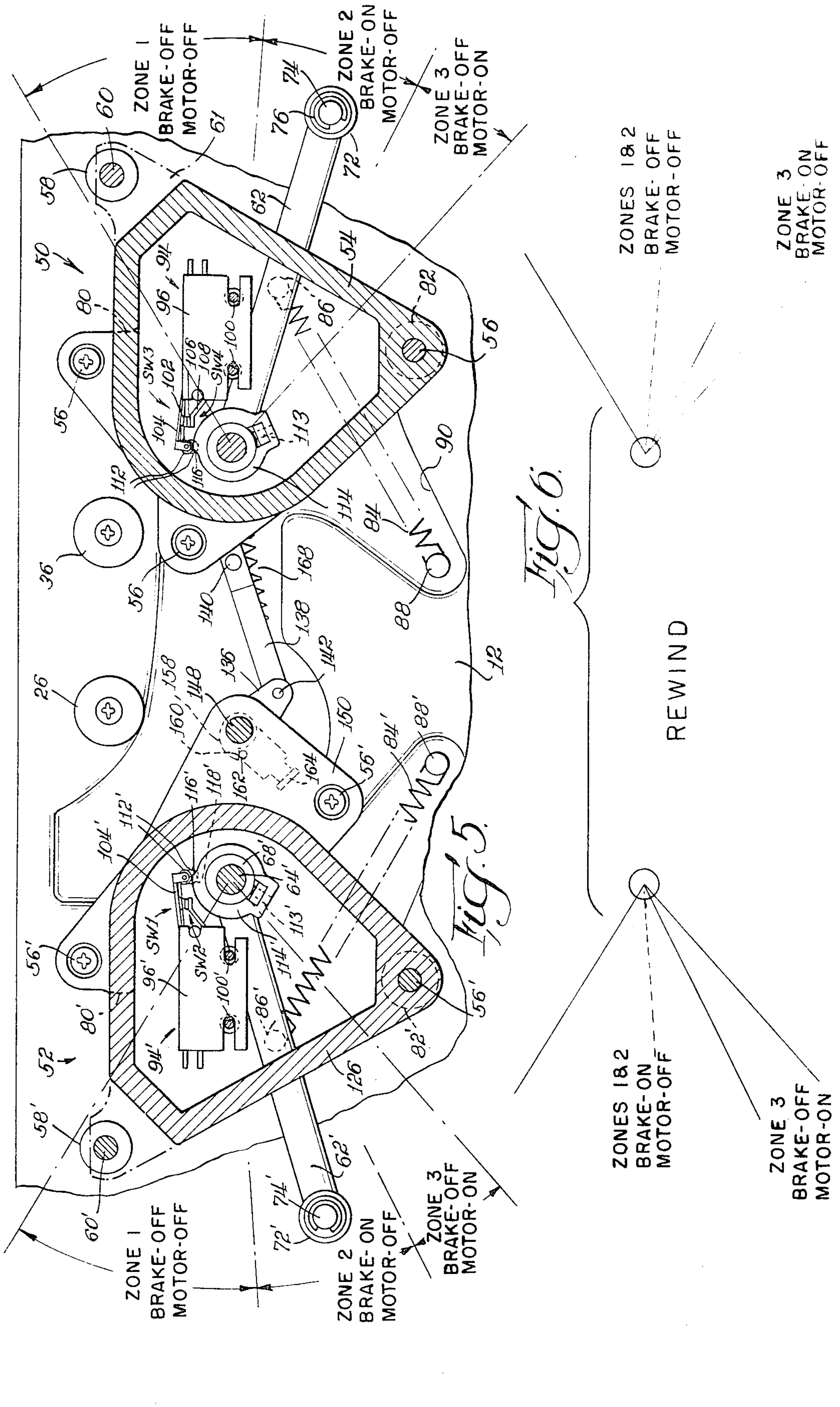
FIG. 5 is a partial front sectional view similar to FIG. 2 but illustrating the tension arms and associated cam and switch contacts, and schematically indicating the different arcuate zones between which the tension arms are moved during operation.
FIG. 6 schematically shows the different arcuate zones and the corresponding operating conditions established by movement of the tension arms between the arcuate zones during rewind.

Noting FIG. 1, taken in conjunction with FIGS. 2, 3 and 5, the tape storage device 50 includes a housing 54 secured to the outer surface of the mounting plate 12 through mounting screws 56. The housing 54 supports a tape guide roller 58 for rotation on and about a depending support shaft 60 secured in normal relation to a portion 61 of housing 54. The housing portion 61 is spaced above the surface of support plate 12 such that the guide roller 58 is generally coplanar with the tape guide roller 36 with the axis of roller 58 is being positioned between the guide rollers 36 and lying generally in a plane containing the axes of the rollers 36.

The tape storage device 50 includes tape tension sensor means comprising an elongated tension arm 62 pivotally supported by the housing 54 on a depending pivot shaft 64, the upper end of which is received within an aperture 66 in the housing 54 and suitably secured therein as by a press fit. The inner end of the tension arm 62 has an aperture therethrough to fixedly receive a bearing sleeve 68 which is journaled about he pivot shaft 64 and maintained in fixed longitudinal relation thereon through retaining rings 70. The outer end of the tension arm 62 supports a tape engaging roller 72 for free rotational movement about a stub shaft 74 suitably fixedly secured in upstanding relation to the outer end of the tension arm. The tape engaging roller 72 is supported on the stub shaft 74 such that it is generally coplanar with the tape guide rollers 36 and 58 and is retained on the shaft 74 through a retainer ring 76.

The tension arm 62 and its associated tape engaging roller 72 is pivotally movable through arcuate zones, to be described more fully below, between an uppermost position for threading a tape between reels 14 and 16 as shown in solid lines in FIG. 2, and lower arcuate positions one of which is indicated in phantom in FIG. 2. To this end, the housing 54 is recessed at 78 (FIG. 3) a distance sufficiently above the surface of the mounting plate 12 to accommodate free pivotal movement of the tension arm 62. The extent of pivotal movement of tension arm 62 is limited by engagement with a housing surface 80 defining an upper pivotal limit, and by engagement with a depending boss portion 82 providing a lower pivotal limit. The tension arm 62 is urged or biased to its lowermost arcuate pivotal position by a coil tension spring 84 having one end connected to a depending shaft 86 secured to the tension arm, and the opposite end connected to the mounting plate 12 through a stub shaft 88. The shaft 88 is fixedly secured in upstanding relation to a depressed recess portion 90 formed in the mounting plate 12 to accommodate the tension spring 84 and provide operating clearance for the spring and associated support shafts 86 and 88.

Figures 7, 10, 11:
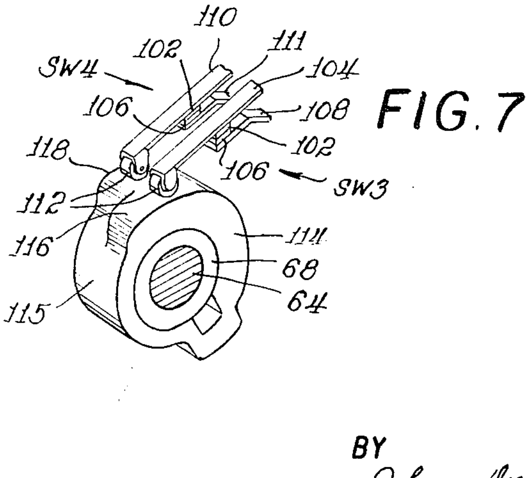
FIG. 7 is an enlarged partial perspective view illustrating a can and the associated switch contact arms.
FIGS. 10 and 11 are truth tables showing logic states of the logic circuits shown schematically in FIG. 9.

Referring to FIG. 5, taken in conjunction with FIGS. 3 and 7, the tape storage device 50 includes switch means, indicated generally at 94, operatively associated with the tension arm 62 and the associated servo drive means 40 for the tape reel 16 to control rotation and braking of the tape reel 16 in relation to movement of the tension arm 62.

The switch means 94 includes a switch body 96 fixedly secured to an inner surface 98 (FIG. 3) within the housing 54 through mounting screws 100. The switch body 96 supports upper and lower pairs of normally closed switch contacts, the upper pair of switch contacts being indicated generally at SW3 and including a first conductive contact 102 supported on a movable metallic switch arm 104 and a second conductive contact 106 supported on a generally fixed contact arm 108. The lower pair of switch contacts underlies the contacts of switch SW3 and is indicated generally at SW4. The lower switch SW4 includes conductive contacts identical to the conductive contacts 102 and 106 of SW3, the contacts of SW4 being conductively supported on a movable lower switch arm 110 and on a lower generally fixed contact arm 111. The upper and lower switch arms 104 and 110, respectively, of the upper and lower switches SW3 and SW4 have generally U-shaped outer end portions which rotatably support rollers 112 for engagement with the outer peripheral surface of a cam 114 adapted to selectively open the normally closed switch contacts.

The cam 114 comprises a portion of the above noted sensor means for the tape storage device 50 and is fixedly secured on the bearing sleeve 68 through an adjustment screw 113 for rotational movement about the axis of the support shaft 64 conjointly with pivotal movement of the tension arm 62. The cam 114 has upper and lower peripheral track surfaces for engagement, respectively, with the rollers 112 carried by the upper and lower switch arms 104 and 110. The cam tracks are generally similar and include an arcuate surface portion 115 (FIG. 7) having a radius such that the contacts of switches SW3 and SW4 are closed when the rollers 112 contact the surface portion 115 of the cam. The cam track associated with the roller 112 on the upper switch arm 104 has a lobe portion 116 adapted to effect inward and outward movement of the upper switch arm 104 relative to the axis of the cam for opening and closing the associated switch contacts 102 and 106 as the roller 112 passes over the lobe 116 during rotation of the cam. Similarly, the lower peripheral track of cam 114 associated with the roller 112 on the lower switch arm 110 has a lobe 118 thereon similar to the lobe 116 and adapted to effect opening and closing of the switch contacts of SW4. Cam lobe 118 is angularly displaced about the axis of cam 114 relative to the cam lobe 116 such that the switch contacts associated with the switch arm 104 of switch SW3 are opened prior to opening of the switch contacts of switch SW4 as the cam is rotated in the direction of that arrow thereon in FIG. 7. In this manner, it will be understood that rotation of the cam 114 in a direction opposite to the arrow thereon in FIG. 7 will effect sequential closing of the contacts of switches SW3 and SW4 from their open positions. The angular relation of cam lobes 116 and 118 about the axis of cam 114 establishes an arcuate zone during which one of the switches SW3 and SW4 is opened and the other is closed.

The upper switch contacts of SW3 are electrically connected in circuit with the control circuit means for the associated servo drive motor 40 associated with the take-up reel 16. The lower switch contacts of SW4 are connected in circuit with the control circuit means associated with the brake means 44 associated with the take-up reel 16. The noted angular relation of the lobes 116 and 118 about the axis of cam 114 and the angular positioning of the cam on bearing sleeve 68 is such that the associated switch contacts of SW3 and SW4 are opened and closed when the tension arm 62 is in selected arcuate zones relative to its pivot axis 64. Noting FIG. 5, when the tension arm 62 is within an arcuate zone designated Zone 1, both pairs of switch contacts SW3 and SW4 are opened to establish motor-off, brake-off conditions for the associated take-up reel servo drive motor 40 and brake means 44. When the tension arm 62 is moved arcuately downwardly to a zone indicated as Zone 2, the upper switch contacts of SW3 are maintained in an open relation and the lower contacts of SW4 are closed due to the associated roller 112 on switch arm 110 passing over the cam lobe 118 to engage cam surface 115. With the tension arm 62 in Zone 2, motor-off, brake-on conditions are established in the associated servo drive motor 40 and brake means 44. When the tension arm 62 is moved to a still lower arcuate position indicated as Zone 3, both switches SW3 and SW4 will be closed by virtue of a simultaneous rotation of the cam 114 to a position wherein the switch arm rollers 112 both engage cam surface 115. In the Zone 3 arcuate position, motor-off, brake-off conditions are established in the associated servo drive motor 40 and brake means 44.

As indicated above, the tape storage device 52 is generally similar to the tape storage device 50. Its description will therefore be brief with regard to all elements which are substantially identical to the corresponding elements of the tape storage device 50. Elements of tape storage device 52 which find similar counterparts in the tape storage device 50 will be identified with similar but primed reference numerals. The tape storage device 52 includes a housing 126 having a configuration similar to the housing 54 of the tape storage device 50, but is generally a mirror image of the housing 54. The housing 126 is secured to the surface of support plate 12 through mounting screws 56′ and has a tape guide roller 58′ rotatably supported on a depending support shaft 60′ such that the guide roller is generally coplanar with the guide rollers 26 and spaced therebetween.

The tape storage device 52 includes sensor means comprising a tension arm 62′ similar to that above described with respect to the tape storage device 50, which tension arm 62′ is pivotally supported on a pivot shaft 64′ for movement through arcuate zones in similar fashion to the tension arm 62 of the tape storage device 52. The tension arm 62′ of the tape storage device 52 rotatably supports a tape engaging roller 72′ on a stub shaft 74′ fixed to the outer end of the tension arm 62′ in upstanding relation thereon. In similar fashion to the tape storage device 50, the extent of angular pivotal movement of tension arm 62′ of the tape storage device 52 is limited by engagement of tension arm 62′ with a housing surface 80′ and a depending boss portion 82′. The tension arm 62′ is urged to a lowermost arcuate position abutting the depending boss 82′ by a tension spring 84′ having its end portions connected, respectively, to a depending shaft 86′ secured to the support arm 62′ and a support pin 88′ secured in upstanding relation to the plate 12 within a depressed portion 90′ thereof.

Noting FIG. 5, the tape storage device 52 has switch means, indicated generally at 94′, secured to the housing 126 through mounting screws 100′ in similar fashion to the mounting of the above-described switch means 94. The switch means 94′ has two pair of normally closed switch contacts, indicated generally at SW1 and SW2, which are supported such that SW1 overlies switch SW2 as considered in FIG. 5. The switch contacts SW1 and SW2 include switch arms 104′ and 110′, respectively, which have rollers 112′ rotatably supported on the outer ends thereof for engagement with the peripheral surface of a cam 114; affixed to a bearing sleeve 68′ so as to be conjointly rotatable with the tension arm 62′ in similar fashion to the above described cam 114. The cam 114' includes upper and lower lobes 116' and 118' which are angularly offset relative to each other, when considered in a plane normal to the axis of rotation of the cam 114', and serve to effect opening and closing of the switch contacts of SW1 and SW2 during rotation of the cam conjointly with angular movement of tension arm 62'. The switch means 94' is electrically coupled to the control circuit means for the associated tape supply reel servo drive motor 38 and brake means 42 in a manner to control rotation and braking of the tape supply reel 14.

As noted, the tension arm 62' of the tape storage device 52 is movable through arcuate zones in similar fashion to the above described tension arm 62 of the tape storage device 50. The arcuate zones are correlated with actuation of the switch contacts of SW1 and SW2 such that when the tension arm 62' is disposed in the arcuate zone designated Zone 1 in FIG. 5, the associated tape supply reel servo drive motor 38 and brake means 42 are in motor-off, brake-off conditions; when the tension arm 62' is in the arcuate zone designated Zone 2, the associated servo drive motor 38 and brake means 42 are in motor-off, brake-on conditions; and when the tension arm 62' is in the zone designated Zone 3, the associated servo drive motor 38 and brake means 42 are in motor-on, brake-off conditions.

Figure 4:
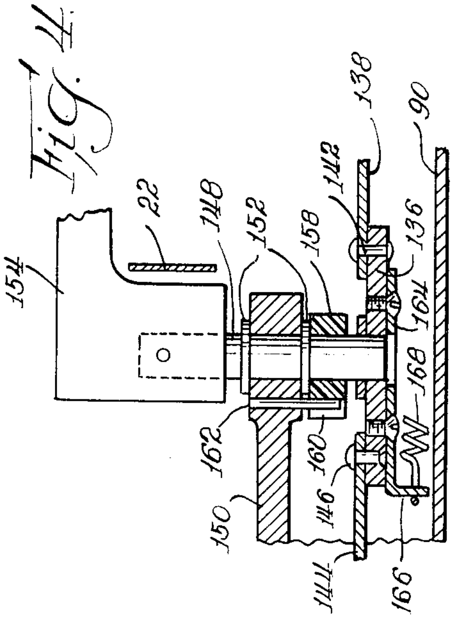
FIG. 4 is an enlarged partial sectional view taken generally along the line 4—4 of FIG. 1 showing the tape threading control lever mounting.

Considering FIG. 2, taken in conjunction with FIGS. 3 and 4, means are operatively associated with each of the tape storage devices 50 and 52 to allow manual movement of their respective tension arms 62 and 62' to their uppermost arcuate positions for initial threading or removal of a tape through or from the tape guide path between the supply and take-up reels 14 and 16. Such means comprise actuating arms 130 and 130' associated, respectively, with the tension arms 62 and 62'. The actuating arms 130 and 130' are supported for pivotal movement about the depending support shafts 64 and 64', respectively, and have radial lengths sufficient to engage the corresponding depending pins 86 and 86' on the tension arms when the actuating arms are moved in a direction to effect upward angular movement of their outer end portions, considered in FIG. 2. The actuating arms 130 and 130' are maintained in fixed longitudinal relation on the support shafts 64 and 64' through retaining rings, one of which is shown at 132 in FIG. 3.

The actuating arms 130 and 130' have radial arm portions 134 and 134' which are angularly offset from the elongated portions adapted to engage depending pins 86 and 86'. The arm portion 134 of actuating arm 130 is connected to one end of a pivotally supported toggle lever 136 through an adjustable length linkage 138 having two aligned portions adjustably secured together through adjustment screws 140 in a known manner. The linkage 138 is pivotally secured to the arm portion 134 of adjusting arm 130 and the associated end of lever 136 through pivot pins 142. The arm portion 134' of the actuating arm 130' is connected to the opposite end of the toggle lever 136 through a connecting link 144 and pivot pins 146.

The toggle lever 136 is fixedly secured to the lower end of a depending support shaft 148 which is supported for rotation within a suitable aperture in a portion 150 of the housing 126, the housing portion 150 overlying the depressed portion 90 formed in the support plate 12. The shaft 148 is maintained in fixed longitudinal relation within the housing portion 150 through retaining rings 152. A tape threading arcuate lever 154 is suitably fixedly secured to the upper end of shaft 148 such that rotational movement of the lever 154 effects rotational movement of the shaft 148 and thereby rotational movement of the pivot lever 136.

Considering FIG. 5, taken in conjunction with FIG. 4, a rotation limiting member 158 is fixedly secured to the shaft 148 below the housing portion 150. The rotation limiting member 158 has a peripheral configuration adapted to allow generally free rotation of shaft 148 but has a radially disposed abutment surface 160 adapted to selectively abut a depending stop pin 162 fixedly secured within an appropriate aperture in the housing 150. The angular position of the abutment surface 160, relative to a line passing through the pivot pins 146 and 142 in the toggle lever 136, is such that the abutment surface 160 will engage the stop pin 162 when the actuating arms 130 and 130' are rotated downwardly about their associated pivot axes 64 and 64' to positions as shown in phantom lines in FIG. 2. An arm 164 is suitably secured to the lower surface of the toggle lever 136 such that the longitudinal axis of arm 164 is approximately normal to a straight line passing through the pivot pins 142 and 146 on the toggle lever 136. The arm 164 has a depending end portion 166 to which is secured one end of a tension spring 168, the opposite end of the tension spring being secured to an upstanding pin 170 affixed to the support plate 12 within the depressed portion 90 thereof. Noting FIGS. 2 and 5, the configuration of the lever 164 and its operative connection to the tension spring 168 is such that the lever 164 and spring 168 form an over-center action about the shaft 148 during manual rotational movement of the toggle lever 136 through the threading lever 154. In this manner, it will be seen that when the threading lever 154 is rotated to a position wherein the toggle lever 136 is in a position as shown in FIG. 2, the tension spring 168 will urge the actuating arms 130 and 130' and the associated tension arms 62 and 62', to their uppermost angular positions within the arcuate Zones 1, the tension arms being limited in such upward pivotal movement through engagement with the housing surface portions 80 and 80'. Conversely, when the threading lever 154 is rotated to release the actuating arms 130 and 130' form the corresponding tension arms 62 and 62', the tension spring 168 will urge the actuating arms 130 and 130' to the positions shown in phantom in FIG. 2, after the arm 164 has moved to a position wherein the axis of tension spring 168 passes over center of the shaft 148. The spring rate of spring 168 is selected such that the tension force in the spring is sufficient to maintain the actuating arms in either their operative or inoperative positions during operation of the tape transport 10.

The operation of the above-described elements comprising the tape transport apparatus 10 is as follows. A further description of operation in conjunction with the reel servo drives and control logic circuits is set forth more fully below. As noted above, the supply and take-up reels 14 and 16, respectively, are motor driven only in a direction to take up tape. The position of the tension arms 62' and 62 corresponding, respectively, to the supply and take-up reels determine the states of their associated reel servo drives. Initially, in threading the tape 22 between the supply and take-up reels, with the power turned on, the threading lever 154 is rotated to a position to effect raising of the tension arms 62 and 62' to upward positions as shown in FIG. 2 such that the associated arm supported rollers 72 are disposed above the corresponding guide rollers 58 and 58' supported by the housings 54 and 126. The tape 22 is then threaded over the guide rollers 26 between the rollers 58' and 72', downwardly through the photocell 28, over the capstan 24, passed over the write/read head 30, over the guide rollers 32 and 34, over the upper guide rollers 36 between the take-up tape storage rollers 58 and 72, and downwardly to the take-up reel 16. The threading lever 54 is then rotated to a position moving the actuating arms 130 and 130' to their lowermost positions as shown in phantom in FIG. 2, allowing the tension arms 62 and 62' to be urged downwardly through their associated tension springs 84 and 84', it being understood that the reel servo drive motors and their associated brake means are deenergized to allow rotation of the associated reels. In such slack tape condition, the tension arms are held at the lower end of their operating Zones 3 by the springs 84 and 84'. If the presence of tape is then sensed by the photocell 28, the reel servo drive motors are energized to take-up tape until the tension arms 62 and 62' are lifted from their Zone 3 positions into the operating Zones 2. At this time, the associated switches 94 and 94' will place both reel servo drives in the fully braked conditions.

Should a forward mode of operation be selected, the capstan drive wheel 24 is caused to rotate to move the tape forward over the write/read head 30, thereby removing tape from the supply reel and adding tape to the take-up reel. This will allow the take-reel tension arm 62 to move downward to its at-rest operating Zone 3 to store the slack tape created. Movement of arm 62 to Zone 3 which will place the corresponding take-up reel servo drive in its brake-off, motor-on state to take up the excess tape from storage. Simultaneously, the supply reel tension arm 62′ is pulled up into its operating Zone 1 from Zone 2 by the taking up of tape stored by the tension arm roller 72′ due to the capstan drive, which action established the supply reel servo drive in a motor-off, brake-off free turning state. Thereafter, the spring 84′ associated with the tension arm 62′ will tend to pull the arm 62′ toward its Zone 2 position, unwinding tape from the supply reel. When the tape unwinds to the extent that the tension arm 62′ reaches the Zone 2 position, the supply reel drive will shift to its fully braked state, that is, its motor-off, brake-on condition.

Under normal operation conditions for forward tape motion, the take-up reel drive alternately shifts from the motor driven state to the fully braked state as the tension arm 62 is moved between Zones 2 and 3 which effects commands to the take-up reel servo drive motor 40 and brake means 44. The supply reel servo drive alternately shifts from a free turning state to the fully braked state on command from the associated tension arm 62′ as it is moved between zones 1 and 2. The functions of the supply and take-up reel servo drives are reversed when a reverse mode of operation is selected by an external command signal to transfer the tape from reel 16 to reel 14. As noted, the brake means 42 and 44 are of the anti-backlash type to prevent the reel drive servo system from hunting or chattering at the switching points.

The operation of the reel drive control logic, described below, is modified during a rewind mode of operation by a rewind order from the logic control circuit. FIG. 6 schematically illustrates the modified operating zones for the storage and sensor devices 50 and 52 during a rewind mode of operation. As shown, in a rewind mode the supply reel servo drive, which acts as the take-up reel drive during rewind, is limited to either a motor-on condition or a brake-on condition. This is effected through the above-described Zones 1 and 2 for the supply tension arm 62′ being effectively combined into a first operating zone providing a motor-off, brake-on condition, and a second operating zone providing a motor-on, brake-off condition. In the rewind mode of operation, the take-up reel drive, which is actually supplying tape in the rewind mode, is limited to a free running condition or a brake-on condition. During the rewind mode, the operating zones for the tension arm 62 are combined to establish a first operating zone combining the above arcuate Zones 1 and 2 which provides a motor-off, brake-off or free turning condition, and a second zone which provides a motor-off, brake-on condition and which has an arcuate extent identical to the above described Zone 3 for the tension arm 62.

As noted above, the tape transport apparatus 10 is basically a self-contained unit. To this end, the following described control circuits and logic circuits may be readily provided on circuit boards which are suitably supported by the support plate 12 of the transport chassis.

REEL DRIVE CONTROL CIRCUITS

Figure 8:
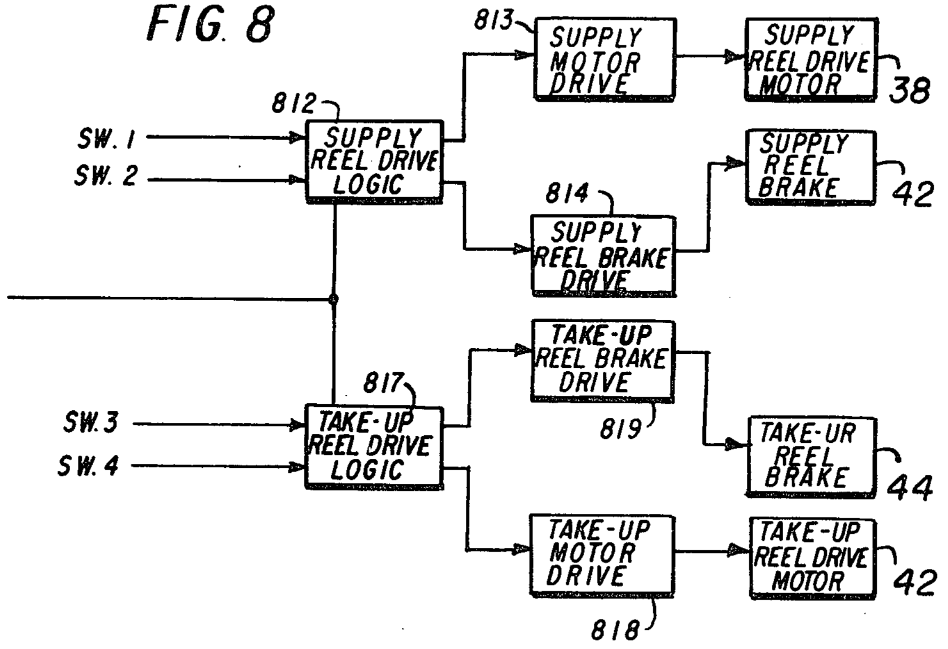
FIG. 8 is a block diagram of the reel drive control circuits.

A block diagram of the reel drive control circuits is set forth in FIG. 8. The supply reel drive motor 38 and the supply reel brake 42 are controlled by supply reel drive logic circuits 812 which selectively enable a supply motor drive circuit 813 and a supply reel brake drive circuit 814 in accordance with whether or not switches SW1 and/or SW2 are opened or closed as determined by the position of the supply tension arm 62′.

The supply reel motor drive circuit 813 may, for example, comprise a semiconductor switching device, such as a Thyristor, which when switched in response to an enabling gate signal applied to the gate of the Thyristor by the supply reel drive logic circuits 812, is effective to connect the supply reel drive motor 38 to AC operating power.

The supply reel brake drive circuit 814 may, for example, comprise a semiconductor switching device responsive to a further enabling signal provided by the supply reel drive logic circuits 812 to effect energization of an operating solenoid of the supply reel brake 42.

The derivation of the supply reel motor drive enabling signal and the supply reel brake drive enabling signal will be described hereinafter.

The take-up reel drive motor 40 and the take-up reel brake 44 are similarly controlled by take-up reel drive logic circuits 817 which selectively enable a take-up motor drive circuit 818 and a take-up reel brake drive circuit 819 in accordance with whether or not switches SW3 and/or SW4 are opened or closed as determined by the position of the take-up tension arm 62.

The take-up reel motor drive circuit 818 and the take-up reel brake drive circuit 819 are similar to the supply reel motor drive circuit 813 and the supply reel brake drive circuit 814 described above.

Figure 9:
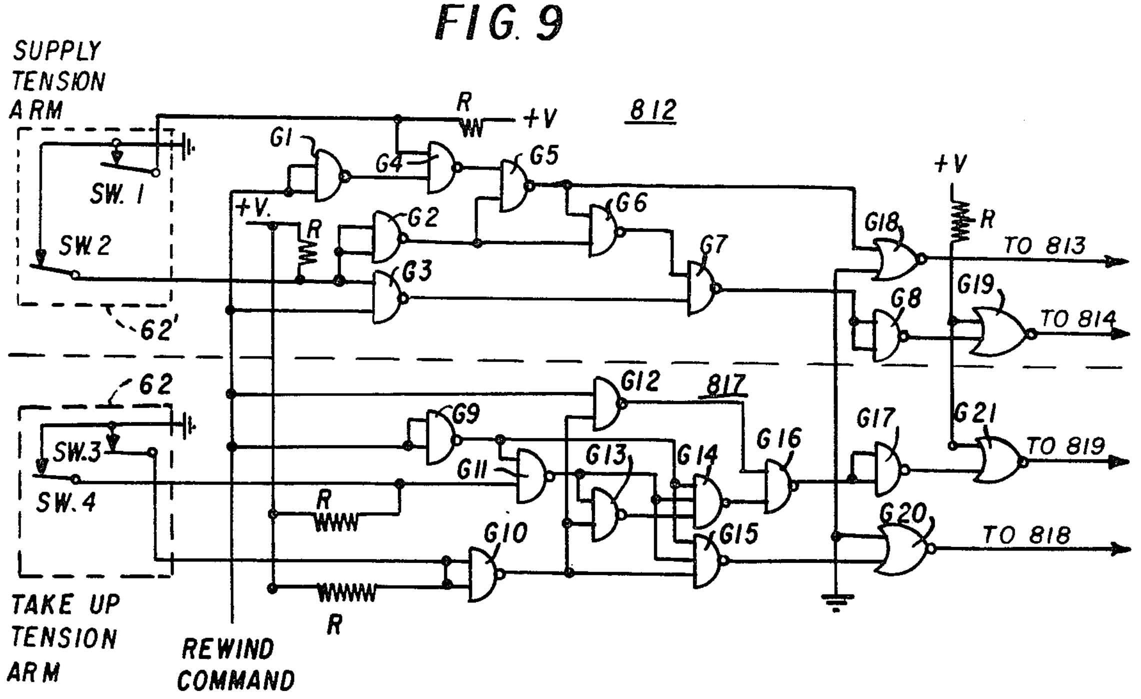
FIG. 9 is a schematic diagram showing the supply reel and take-up reel logic circuits.

The supply reel logic circuits 812 and the take-up reel logic circuits 817, shown schematically in FIG. 9, comprise NAND gates G1 through G17 and NOR gates G18 through G21 interconnected as shown in FIG. 9 to provide enabling signals for the supply motor drive circuit 813, the supply reel brake drive circuit 814, the take-up motor drive circuit 818, and the take-up reel brake drive circuit 819. The manner of operation of the circuits can be determined by referring to the Truth Tables A and B shown in FIGS. 10 and 11, respectively. Accordingly, in the illustrative examples which follow, only certain modes of operation are described in detail.

OPERATION OF DRIVE LOGIC CIRCUITS

As described in the foregoing, in the absence of tape or in a slack tape condition, the supply tension arm 62′ and the take-up tension arm 62 will be positioned in operating Zone 3 and switches SW1–SW4 will be closed. Accordingly, the supply reel drive logic gates 812, shown in FIG. 9, will provide the logic outputs given in the first row (Zone 3) of Truth Table A in FIG. 10.

Thus, referring to FIG. 9, and the Truth Table A, under these conditions switches SW1 and SW2 provide logic 0 levels or ground potentials at the inputs of NAND gates G2, G3, G4, disabling these gates to provide logic 1 or +V levels at the outputs of gates G2, G3, G4.

The outputs of gates G2 and G4 enable gate G5 to provide a logic 0 level at the output of gate G5.

The logic 0 output of gate G5 enables a NOR gate G18 providing a logic 1 level at the output of gate G18. The output of gate G18 controls the supply motor drive circuit 813, FIG. 8, enabling the motor drive circuit and effecting operation of the supply reel drive motor 38.

The logic 0 output of gate G5 also disables gate G6 to provide a logic 1 output which together with the logic 1 output of gate G3 enables gate G7 providing a logic 0 level output.

The logic 0 output of gate G7 through inverter G8 disables a NOR gate G7 through inverter G8 disables a NOR gate G19 to provide a logic 0 at the output of gate G19. The output of gate G19 controls the supply reel brake drive circuit 814, disabling the supply brake circuit.

Thus, when the supply tension arm 62′ is positioned in operating Zone 3, the supply motor 38 is energized and the brake 42 is deenergized.

As can be shown from Truth Table B, FIG. 11, when the take-up tension arm 62 is in operating Zone 3 gates G9 through G17 and G20 and G21 which comprise the take-up reel drive logic circuits 817 are similarly responsive to the logic levels provided by switches SW3 and SW4 to effect energization of the take-up reel motor 40 and the deenergization of the take-up reel brake 44. The logic levels for gates G9 through G17 and G20 and G21 responsive to these conditions are given in the first row (Zone 3) of Truth Table B.

As can be seen in the first row of Table B, gate G20 is enabled, providing a logic 1 output for enabling the take-up motor drive circuit 818, and gate G21 is disabled, providing a logic 0 output for disabling the take-up brake drive circuit 819.

When both the supply reel drive motor 38 and the take-up reel drive motor 40 are operatively energized, the slack in the tape 22 will be decreased, and the supply tension arm 62' and the take-up tension arm 62 will be moved into their second operative Zones 2, causing switches SW1 and SW3 to be opened to provide the logic output given in the second rows (Zone 2) of Truth Tables A and B. Accordingly, as can be shown, the supply reel brake 42 and take-up reel brake 44 will be energized and the supply reel drive motor 38 and the take-up reel drive motor 40 will be deenergized.

Subsequently, assuming the tape transport controls are set to provide tape drive in the forward direction (from reel 14 to reel 16), the supply tension arm 62' will be moved from Zone 2 to Zone 1 changing the state of the supply reel 14 from fully braked to free turning, that is, brake-off, motor-off; and the take-up tension arm 62 will be moved from Zone 2 to Zone 3 changing the state of the take-up reel 16 from fully braked to fully motor driven, that is, brake-off, motor on.

The response of the logic gates G1 through G21 to the movement of the supply tension arm 62' and the take-up tension arm 62 to effect these changes in the states of the supply reel 14 and the take-up reel 16 are given in the Truth Tables A and B. As the supply tension arm 62' moves from Zone 2 to Zone 1, the logic outputs shown in row two of Table A assume the levels shown in row three (Zone 1).

Similarly, in response to movement of the tension take-up arm 62 from Zone 2 to Zone 3, the logic outputs from Zone 2 shown in Table B assume the levels shown in the first row (Zone 3).

For reverse operation, the supply tension arm 62' will be moved from Zone 2 to Zone 3 and the take-up tension arm will be moved from Zone 2 to Zone 1. The corresponding logic levels can be determined by referring to the Truth Tables A and B.

REWIND OPERATION OF DRIVE LOGIC CIRCUITS

For a rewind condition, the supply reel drive logic circuits 812 are effective to provide only two operating states, namely, supply reel motor off, supply reel brake-on, and supply reel motor-on, supply reel brake off, for the supply reel. Moreover, the tape-reel drive logic circuits 817 provide only two operating states, namely take-up reel motor-off, take-up reel brake-off; and take-up reel motor-off, take-up reel brake-on, for the take-up reel.

In the case of the supply tension arm 62', operating Zones 2 and 3 provide the same operating state, and operating Zones 1 and 2 of the take-up tension arm 62 provide the same operating state.

Assuming that the supply tension arm 62' is positioned in operating Zone 3, switches SW1 and SW2 remain closed and the logic outputs for gates G1 through G8 and G18 and G19 are given in the fourth row (Zone 3) of Truth Table A, FIG. 10. In the rewind condition, the rewind command signal from a tape logic circuit or other external input (not shown) enables gate G1 providing a logic 0 at the output thereof for disabling gate G4. The rewind command signal also provides a logic 1 enabling signal for gate G3. However, gate G3 is disabled by the logic input provided by closed switch SW2. Thus, comparing the logic outputs for gates G2 through G8 and G18 and G19 given in row four (Zone 3 R) of Truth Table A with those given in row one (Zone 3 $\bar{R}$) of the same Table, it is seen that when the supply tension arm 62' is in Zone 3, the supply reel logic circuits 812 provides essentially the same output functions for both the rewind and non-rewind conditions. It has already been shown in the foregoing description that these conditions will result in the enabling of the supply reel motor drive circuit 813 and the disabling of the supply reel brake drive circuit 814.

Assuming now that the supply tension arm 62' is moved into operating Zone 2, switch SW1 is opened removing the disabling input from gate G4. However, gate G1, which inverts the rewind command input signal, provides a further disabling signal for gate G4. Thus, referring again to Truth Table A, when the supply tension arm is in operating Zone 2 the logic levels for the gates G1 through G8 and G18 and G19, given in row five (Zone 2), are identical with the outputs given in row four (Zone 3) for operating Zone 3 under a rewind condition.

The logic levels provided by gates G1 through G8 and G18 and G19, when the supply tension arm is moved to Zone 1, are given in row six of Truth Table A. Under this condition, as can be seen from Table A, the logic circuits are effective to enable the supply reel brake drive circuit 814 and to disable the supply reel motor drive circuit 813, thereby providing the second operating state.

Thus, as can be seen by comparing the logic outputs in the fourth and fifth rows of the Truth Table A, although the state of switch SW1 is different, the logic gates G1 through G8 provide the same outputs.

Assuming in the rewind mode that the take-up tension arm 62 is positioned in operating Zone 1, switches SW3 and SW4 will be open, and there will be a logic 1 level on the rewind command lead. The logic output levels for these conditions are given in row six of the Truth Table B. The logic 1 level provided when switch SW3 is opened enables gate G10 to provide a logic 0 output for disabling gates G12, G13 and G15.

Gate G15, being disabled, provides a logic 1 at its output for disabling NOR gate G10 providing a logic 0 at the output of gate G20. The logic 0 output of gate G20 disables the take-up reel motor drive circuit 818 so that the take-up reel drive motor 40 is deenergized.

The logic 1 level on the rewind command input enables gate G9 to provide a logic 0 level for disabling gate G14. The logic 1 level provided by gate G14 and the logic 1 level at the output of gate G12 enable gate G16 to provide a logic 0 level which through inverter G17 disables NOR gate G21 providing a logic 0 at the output of gate G21. The logic 0 output of gate G21 disables the take-up reel brake drive circuit 819 so that the take-up reel brake 44 is deenergized.

Thus, when the take-up arm 62 is in Zone 1 during the rewind condition, both the take-up reel brake 44 and the take-up reel motor 40 are deenergized.

Assuming that the take-up tension arm 62 is moved into operating Zone 2, switch SW4 will close and the logic levels of gate G9 through G16 and G20 and G21 will be as shown in the fifth row of Truth Table B. When the output levels of rows five and six of Table B are compared, it is seen that in the rewind condition the operation of switch SW4 has no effect on the logic states of gates G9 through G16 and G20 and G21.

Thus, as is shown in rows five and six of Table B, the operation of switch SW4 has no effect on the states of logic gates G9 through G21 whenever the transport controls are in the rewind mode.

If the take-up tension arm 62 is moved into Zone 3, the logic outputs for the gates of the take-up reel logic 817, will be those given in row four of Table B. Switch SW3 will be operated disabling gate G10 to provide a logic 1 output which enables gates G12 and G13, thereby effecting the disabling of gate G16 to provide a logic 1 at its output. The logic 1 output of gate G16 through inverter G17 enables NOR gate G21 to provide an enabling signal for the take-up reel brake drive circuit 819. The take-up motor drive circuit 818 however, remains disabled since gate G20 is disabled.

While a preferred embodiment of our invention has been shown and described, it will be obvious to those skilled in the art that changes and modifications may be made therein without departing from the invention in its broader aspects.

We claim:

1. A tape transport system including tape supply and take-up reels each having a drive means adapted to effect rotation and braking of the associated reel, a continuous length tape supported by and transferable between the supply and take-up reels, and capstan means disposed intermediate the reels and adapted for operative association with the tape to effect selective transfer of the tape between the supply and take-up reels, the combination comprising, tape storage means disposed between said supply and take-up reels and cooperable with the tape during transfer thereof between said supply and take-up reels, said storage means including sensor means adapted to engage the tape and being movable to a plurality of discrete non-overlapping zones to accommodate variations in the length of tape between the supply and take-up reels, said storage means further including switch means operatively associated with said sensor means and the reel drive means, said switch means being selectively operable by said sensor means responsive to movement to said discrete zones to establish separate and distinct rotation and braking conditions of the reel drive means for each of said discrete zones to maintain substantially constant linear tape travel over the capstan.

2. The combination defined in claim 1 wherein said storage means includes a pair of tape storage devices each of which is disposed between one of the supply and take-up reels and the capstan, and wherein each of said tape storage devices includes sensor means adapted to engage the tape and being movable to accommodate variations in tape length between the capstan and the associated tape reel.

3. The combination as defined in claim 2 wherein said storage means includes switch means operatively associated with each of said sensor means, and wherein each of said sensor means includes a tension arm pivotally movable between said discrete non-overlapping arcuate zones, each of said switch means being responsive to movement of the associated tension arm between said arcuate zones to establish said separate and distinct rotation and braking conditions of the associated supply or take-up reel.

4. The combination as defined in claim 3 including means urging each of said tension arms to the arcuate zone causing the associated tension arm to accommodate its maximum storage amount of tape between the capstan and the associated tape reel.

5. The combination of claim 3 wherein each of said tension arms is movable through three non-overlapping arcuate zones, and wherein each of said switch means includes a plurality of switch contacts, said switch contacts being selectively actuated responsive to movement of the associated tension arm to one of its three arcuate zones to effect rotary driving, braking or free rotation of the associated tape reel.

6. The combination of claim 3 wherein each of said sensor means includes cam means operatively connected to the associated tension arm and rotatable about the pivotal axis of the associated tension arm, each of said switch means having switch contacts operable by the associated cam means to establish said separate and distinct rotation and braking conditions of the associated tape reel in relation to the arcuate position of the associated tension arm.

7. The combination defined in claim 6 wherein each of said tension arms has a roller rotatably supported thereon for engagement with the tape as it is transferred between the tape reels, each of said rollers and its associated tension arm being movable between said arcuate zones in relation to the tension in the tape adjacent the roller.

8. A transport system including tape supply and take-up reels each having drive means adapted to effect rotation and braking of the associated reel, a continuous length tape supported by and transferable between the supply and take-up reels, and capstan means disposed intermediate the reels and adapted for operative association with the tape to effect selective transfer of the tape between the supply and take-up reels, the combination comprising, tape storage means including a pair of tape storage devices each of which is disposed between one of said supply and take-up reels and the capstan, each of said storage devices having a tension arm engageable with the tape during transfer thereof between said supply and take-up reels, each of said tension arms being pivotally movable through three arcuate zones to accommodate variations in the length of tape between the capstan and the associated tape reel, said storage means further including switch means operatively associated with each of said tension arms and the associated reel drive means, each of said switch means having a plurality of switch contacts selectively actuated by the associated tension arm in response to movement thereof to one of its three arcuate zones to effect rotary driving, braking or free rotation of the associated tape reel, and means for manually adjusting the tension arms to selected ones of said three arcuate zones.

9. The combination of claim 8 wherein said manual adjacent means includes a control lever operative to move each of the tension arms to similar arcuate zones.

10. A tape transport system including tape supply and take-up reels each having tape reel drive means including motor and brake means adapted to effect rotation and braking of the associated reels, a continuous length tape supported by and transferable between the supply and take-up reels, and capstan means disposed intermediate the reels and adapted for operative association with the tape to effect selective transfer of the tape between the supply and take-up reels, the combination comprising, tape storage means including a pair of tape storage devices each of which is disposed between one of the supply and take-up reels and the capstan, each of said storage devices having a tension arm engageable with the tape during transfer thereof between the supply and take-up hubs, each of said tension arms being pivotally movable between first, second and third arcuate zones to accomodate variations in the length of tape between the capstan and the associated tape reel, said storage means further including switch means operatively associated with each of said tension arms and the associated reel drive means, each of said switch means having a plurality of switch contacts actuated by the associated tension arm to effect a motor-off brake-off condition of the associated tape reel drive means when the associated tension arm is moved to its first arcuate zone, said switch contacts being actuated to effect a motor-off brake-on condition of the associated tape reel drive means when the associated tension arm is moved to its second arcuate zone, and being actuated to effect a motor-on brake-off condition of the associated tape reel drive means when the associated tension arm is moved to its third arcuate zone.

11. The combination of claim 10 wherein each of said switch means is adapted to effect said tape reel drive means conditions independent of the direction of tape travel.

12. The combination of claim 10 wherein said tape storage devices include means urging said tension arms to their said third arcuate zones.

13. The combination of claim 12 wherein each of said sensor means includes a cam means operatively connected to the associated tension arm and rotatable about the pivotal axis of the associated tension arm, each of said switch means having normally closed switch contacts adapted to be opened by said cam means, said cam means having lobe portions thereon adapted to open said switch contacts, said lobe portions being circumferentially disposed about each cam in a manner to selectively open said switch contacts when the cam is moved to different arcuate zones responsive to movement of the associated tension arm for controlling rotation and braking of the associated tape reel in relation to the position of the associated tension arm.

14. The combination as defined in claim 10 and further including logic circuit means adapted to establish the supply reel drive means in a motor-off brake-on condition when the corresponding tension arm is in its first arcuate zone, said logic circuit being further adapted to establish the supply reel drive means in a motor-on brake-off condition when the corresponding tension arm is in either its second or third arcuate zones.

15. The combination of claim 14 wherein said logic circuit means is adapted to establish a motor-off brake-off condition for the tape take-up reel drive means when the corresponding tension arm is in either its first or second arcuate zones, said logic circuit means being further adapted to establish a motor-off brake-on condition for the take-up reel drive means when the associated tension arm is in it third arcuate zones.

16. A storage device for use with continuous length flexible tape and the like, comprising, in combination, housing means, tension arm means supported by said housing means and movable between arcuate zones, said tension arm means being engageable with a continuous length of flexible tape during longitudinal movement of the tape between generally fixed positions and being movable between said arcuate zones to accommodate variations in the length of tape between the fixed positions, switch means having switch contact means selectively operable by said tension arm means during movement thereof between said arcuate zones, and means for manually moving said tension arm means to a selected one of said arcuate zones.

* * * * *